(12) United States Patent
Guan (10) Patent No.: US 10,205,608 B2
(45) Date of Patent: Feb. 12, 2019

(54) METHOD FOR ENCAPSULATING SERVICE ROUTING PACKET, SERVICE FORWARDING ENTITY AND CONTROL PLANE

(71) Applicant: HUAWEI TECHNOLOGIES CO., LTD., Shenzhen, Guangdong (CN)

(72) Inventor: Hongguang Guan, Nanjing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 183 days.

(21) Appl. No.: 15/284,337

(22) Filed: Oct. 3, 2016

(65) Prior Publication Data

US 2017/0048083 A1 Feb. 16, 2017

Related U.S. Application Data

(63) Continuation of application No. PCT/CN2015/074379, filed on Mar. 17, 2015.

(30) Foreign Application Priority Data

Apr. 4, 2014 (CN) .......................... 2014 1 0135721

(51) Int. Cl.
*H04L 12/46* (2006.01)
*H04L 12/725* (2013.01)
(Continued)

(52) U.S. Cl.
CPC ........ *H04L 12/4633* (2013.01); *H04L 45/306* (2013.01); *H04L 47/2441* (2013.01); *H04L 41/5041* (2013.01); *H04L 47/50* (2013.01)

(58) Field of Classification Search
None
See application file for complete search history.

(56) References Cited

U.S. PATENT DOCUMENTS

2013/0094508 A1 4/2013 Turner et al.
2014/0119189 A1 5/2014 Lin
(Continued)

FOREIGN PATENT DOCUMENTS

CN 101521631 9/2009
CN 101848171 9/2010
(Continued)

OTHER PUBLICATIONS

International Search Report dated Jun. 17, 2015 for PCT/CN2015/074379.

*Primary Examiner* — Saba Tsegaye
(74) *Attorney, Agent, or Firm* — Womble Bond Dickinson (US) LLP (57) ABSTRACT

Embodiments of the present application disclose a method for encapsulating a service routing packet, including: receiving a first packet, and determining that a next hop is a Legacy SPE; temporarily storing a correspondence between an SFC header and a first original packet that are included in the first packet, and sending the first original packet to the Legacy SPE; receiving a returned second original packet, and determining, according to an acquired mapping rule of an original packet of the Legacy SPE, that the SFC header of the first packet corresponds to the second original packet; and encapsulating the SFC header of the first packet in the second original packet, to form a new service routing packet. By means of the embodiments of the present application, a problem of an abnormal interruption caused by a loss of an SFC header can be avoided.

10 Claims, 5 Drawing Sheets

(51) Int. Cl.
*H04L 12/851* (2013.01)
*H04L 12/863* (2013.01)
*H04L 12/24* (2006.01)

(56) References Cited

U.S. PATENT DOCUMENTS

| | | | |
|---|---|---|---|
| 2014/0247751 A1* | 9/2014 | Sonoda | H04L 41/0893 370/254 |
| 2014/0362857 A1* | 12/2014 | Guichard | H04L 45/566 370/392 |
| 2015/0026362 A1* | 1/2015 | Guichard | H04L 45/30 709/242 |
| 2015/0103827 A1* | 4/2015 | Quinn | H04L 45/74 370/392 |
| 2016/0044118 A1 | 2/2016 | Huang et al. | |

FOREIGN PATENT DOCUMENTS

| | | |
|---|---|---|
| CN | 102301663 A | 12/2011 |
| CN | 102932254   | 2/2013 |
| CN | 103166825 A | 6/2013 |
| CN | 103269280 A | 8/2013 |
| CN | 103312613 A | 9/2013 |

* cited by examiner

METHOD FOR ENCAPSULATING SERVICE ROUTING PACKET, SERVICE FORWARDING ENTITY AND CONTROL PLANE

CROSS-REFERENCE TO RELATED APPLICATIONS

This application is a continuation of International Application No. PCT/CN2015/074379, filed on Mar. 17, 2015, which claims priority to Chinese Patent Application No. 201410135721.3, filed on Apr. 4, 2014. The disclosures of the aforementioned applications are hereby incorporated by reference in their entireties.

TECHNICAL FIELD

The present application relates to the field of service function chain technologies, and in particular, to a method for encapsulating a service routing packet, a service forwarding entity, and a control plane.

BACKGROUND

As service types of operators are increasing, to support better service experience, a service routing network needs to be deployed in a network, and a resilient service function chain (SFC) technology is put forward. This technology provides a basis for flexible service processing by linking multiple service processing functions. The SFC technology classifies service flows by using a service classifier (SCLA), and forwards the service flows to different service processing entities (SPE) by using a service forwarding entity (SFE) to perform service processing.

Figure 1:
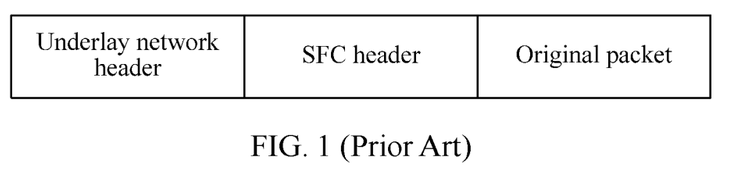
FIG. 1 is a structural block diagram of a conventional service routing packet.

Refer to FIG. 1, which is a structural block diagram of a conventional service routing packet. As shown in FIG. 1, an SFC header (SFC Header, service header) is encapsulated in a packet entering a service routing domain.

The SFC Header includes information such as a path identifier (Path Id) and metadata (Metadata), and an SFE sends, according to the information, the packet to a corresponding SPE for processing. An Underlay (underlying/physical) network is responsible for forwarding of a service routing packet between SFEs.

However, a legacy SPE (Legacy SPE) does not support a packet carrying a service header. Therefore, in the prior art, when a packet is sent to a Legacy SPE, an SFC header needs to be stripped off before the SFE sends an original packet for processing. After finishing processing, the SPE sends a processed packet to the SFE. The SFE needs to add an original SFC header to the processed packet again before sending the packet to a next-hop device.

A problem in the prior art is that after an original packet is processed by a Legacy SPE, if a change occurs, an SFE cannot re-associate an SFC header that is stripped off from the original packet with a processed packet, and as a result, the SFC header of the packet cannot be restored. However, the SFC header includes information about a service function chain, and if the SFC header is lost, the packet abnormally interrupts processing of the service function chain to which the SPC header belongs.

SUMMARY

Embodiments of the present application provide a method for encapsulating a service routing packet, a service forwarding entity, and a control plane, to avoid a problem of an abnormal interruption caused by a loss of an SFC header.

A first aspect provides a method for encapsulating a service routing packet, where the method includes:

receiving a first packet, and determining, according to a service function chain SFC header of the first packet, that a next hop is a legacy service processing entity Legacy SPE, where the first packet includes the SFC header and a first original packet;

temporarily storing a correspondence between the SFC header and the first original packet that are included in the first packet, and sending the first original packet to the Legacy SPE;

receiving a second original packet returned by the Legacy SPE, and determining, according to an acquired mapping rule of an original packet of the Legacy SPE, that the SFC header of the first packet corresponds to the second original packet; and encapsulating the SFC header of the first packet in the second original packet, to form a new service routing packet.

In a first possible implementation manner of the first aspect, the mapping rule of the original packet of the Legacy SPE is:

a correspondence between an element included in a packet header of the original packet before processing by the Legacy SPE and an element included in a packet header of the original packet after processing by the Legacy SPE.

With reference to the first possible implementation manner of the first aspect, in a second possible implementation manner of the first aspect, the element included in the packet header of the original packet is:

any element or a combination of any multiple elements in a 5-tuple of the original packet, where the 5-tuple includes a source IP address, a destination IP address, a source port number, a destination port number, and a transport layer protocol number;

or a checksum of the original packet.

With reference to any one of the foregoing possible implementation manners of the first aspect, in a third possible implementation manner of the first aspect, the determining, according to an acquired mapping rule of an original packet of the Legacy SPE, that the SFC header of the first packet corresponds to the second original packet includes:

determining, according to the mapping rule of the original packet of the Legacy SPE, that the first original packet corresponds to the second original packet; and determining, with reference to the correspondence between the SFC header and the first original packet that are of the first packet, that the SFC header of the first packet corresponds to the second original packet.

With reference to any one of the foregoing possible implementation manners of the first aspect, in a fourth possible implementation manner of the first aspect, the mapping rule of the original packet of the Legacy SPE is acquired by using the following method:

receiving a mapping rule, of the original packet of the Legacy SPE, sent by a control plane; and extracting the mapping rule of the original packet of the Legacy SPE according to the Legacy SPE determined by the SFC header of the first packet.

A second aspect provides a service forwarding entity, where the service forwarding entity SFE includes:

a receiving unit, configured to receive a first packet;

a first processing unit, configured to determine, according to a service function chain SFC header of the first packet, that a next hop is a legacy service processing entity Legacy SPE, where the first packet includes the SFC header and a first original packet;

a second processing unit, configured to temporarily store a correspondence between the SFC header and the first original packet that are of the first packet;

a sending unit, configured to send the first original packet to the Legacy SPE, where the receiving unit is further configured to receive a second original packet returned by the Legacy SPE, a third processing unit, configured to determine, according to an acquired mapping rule of an original packet of the Legacy SPE, that the SFC header of the first packet corresponds to the second original packet; and a fourth processing unit, configured to encapsulate the SFC header of the first packet in the second original packet, to form a new service routing packet.

In a first possible implementation manner of the second aspect, the mapping rule of the original packet of the Legacy SPE is:

a correspondence between an element included in a packet header of the original packet before processing by the Legacy SPE and an element included in a packet header of the original packet after processing by the Legacy SPE.

With reference to the first possible implementation manner of the second aspect, in a second possible implementation manner of the second aspect, the element included in the packet header of the original packet is:

any element or a combination of any multiple elements in a 5-tuple of the original packet, where the 5-tuple includes a source IP address, a destination IP address, a source port number, a destination port number, and a transport layer protocol number;

or a checksum of the original packet.

With reference to any one of the foregoing possible implementation manners of the second aspect, in a third possible implementation manner of the second aspect, the third processing unit includes:

a first mapping subunit, configured to determine, according to the mapping rule of the original packet of the Legacy SPE, that the first original packet corresponds to the second original packet; and a second mapping subunit, configured to determine, with reference to the correspondence between the SFC header and the first original packet that are included in the first packet, that the SFC header of the first packet corresponds to the second original packet.

With reference to any one of the foregoing possible implementation manners of the second aspect, in a fourth possible implementation manner of the second aspect, the receiving unit is further configured to receive the mapping rule, of the original packet of the Legacy SPE, sent by a control plane; and the service forwarding entity further includes:

an extraction unit, configured to extract the mapping rule of the original packet of the Legacy SPE according to the Legacy SPE determined by the SFC header of the first packet.

A third aspect provides a control plane, where the control plane includes:

an acquiring subunit, configured to acquire a mapping rule of an original packet of a legacy service processing entity Legacy SPE; and a sending subunit, configured to send the mapping rule of the original packet of the Legacy SPE to a service forwarding entity SFE.

In a first possible implementation manner of the third aspect, the mapping rule of the original packet of the Legacy SPE is:

a correspondence between an element included in a packet header of the original packet before processing by the Legacy SPE and an element included in a packet header of the original packet after processing by the Legacy SPE.

With reference to the first possible implementation manner of the third aspect, in a second possible implementation manner of the third aspect, the element included in the packet header of the original packet is:

any element or a combination of any multiple elements in a 5-tuple of the original packet, where the 5-tuple includes a source IP address, a destination IP address, a source port number, a destination port number, and a transport layer protocol number;

or a checksum of the original packet.

A fourth aspect provides a control plane, where the control plane includes:

a policy decision point PDP, configured to acquire a mapping rule of an original packet of a legacy service processing entity Legacy SPE; and a service function chain SFC control unit, configured to send the mapping rule of the original packet of the Legacy SPE to a service forwarding entity SFE.

In a first possible implementation manner of the fourth aspect, the mapping rule of the original packet of the Legacy SPE is:

a correspondence between an element included in a packet header of the original packet before processing by the Legacy SPE and an element included in a packet header of the original packet after processing by the Legacy SPE.

With reference to the first possible implementation manner of the fourth aspect, in a second possible implementation manner of the fourth aspect, the element included in the packet header of the original packet is:

any element or a combination of any multiple elements in a 5-tuple of the original packet, where the 5-tuple includes a source IP address, a destination IP address, a source port number, a destination port number, and a transport layer protocol number;

or a checksum of the original packet.

In the embodiments of the present application, an SFE temporarily stores a correspondence between an SFC header of a first packet before processing by a Legacy SPE and an original packet of the first packet, acquires a mapping rule of the original packet before and after processing by the Legacy SPE, and may determine a mapping relationship between a packet after processing by the Legacy SPE and an SFC header of an original packet according to the foregoing correspondence and the mapping rule, thereby implementing re-association of the packet after processing and the SFC header of the original packet, and avoiding a problem of an abnormal interruption caused by a loss of an SFC header.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Embodiments of the present application provide a method for encapsulating a service routing packet, a service forwarding entity, and a control plane, which can implement re-association of a packet after processing and an SFC header of an original packet, and avoid a problem of an abnormal interruption caused by a loss of an SFC header.

Figure 2:
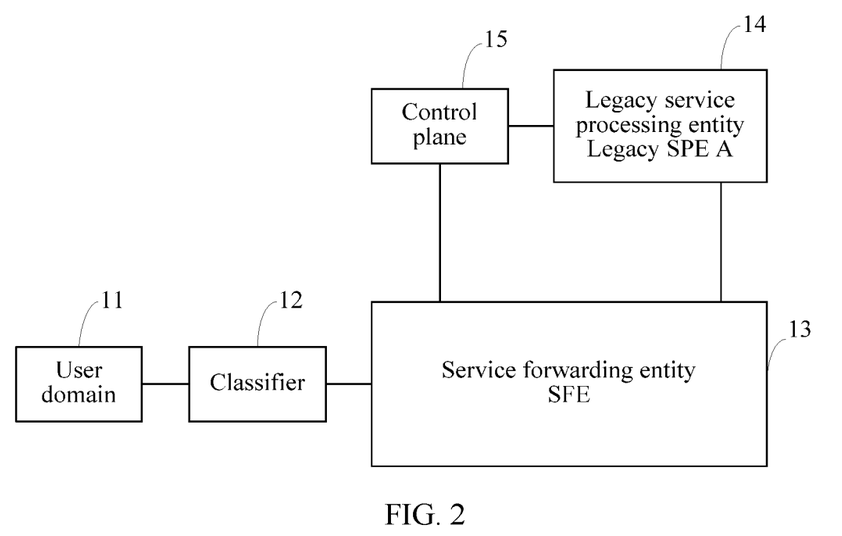
FIG. 2 is a block diagram of a system in which a method for encapsulating a service routing packet may be implemented according to an embodiment of the present application.

Refer to FIG. 2, which is a block diagram of a system in which a method for encapsulating a service routing packet may be implemented according to an embodiment of the present application. As shown in FIG. 2, a user domain 11 sends a packet to a classifier (Ingress SR) 12, where the classifier 12 encapsulates an SFC header in a received packet, and sends the packet in which the SFC header is encapsulated to an SFE 13.

The user domain 11 sends a service routing packet to the classifier 12, and after encapsulating an SFC header in the packet, the classifier 12 sends the packet to the SFE 13. The packet received by the SFE 13 includes at least: an original packet and an SFC header, where the SFC header of the packet includes information such as a Path Id and Metadata. The Path Id indicates path information for forwarding the packet.

After receiving the packet in which the SFC header is encapsulated, the SFE 13 determines, according to the Path Id in the SFC header, that a next hop of the packet is an SPE 14, and the SFE 13 strips off the SFC header of the packet, and sends the packet from which the SFC header is stripped off to a Legacy SPE A 14 for processing.

After receiving the packet processed by the Legacy SPE A 14, the SFE 13 needs to re-associate the packet after processing with the SFC header, to form a new service routing packet, and sends the new service routing packet.

The method and the apparatus in this embodiment of the present application are that: a control plane 15 acquires a mapping rule of an original packet on the Legacy SPE A 14, and sends the mapping rule of the original packet to the SFE 13, so that the SFE 13 can derive, according to a mapping relationship of the original packet, a mapping relationship between the original packet processed by the Legacy SPE A 14 and an SFC header of a packet before processing, thereby implementing re-association of the original packet after processing and the SFC header of the packet before processing, and avoiding a problem of an abnormal interruption caused by a loss of an SFC header.

Figure 3:
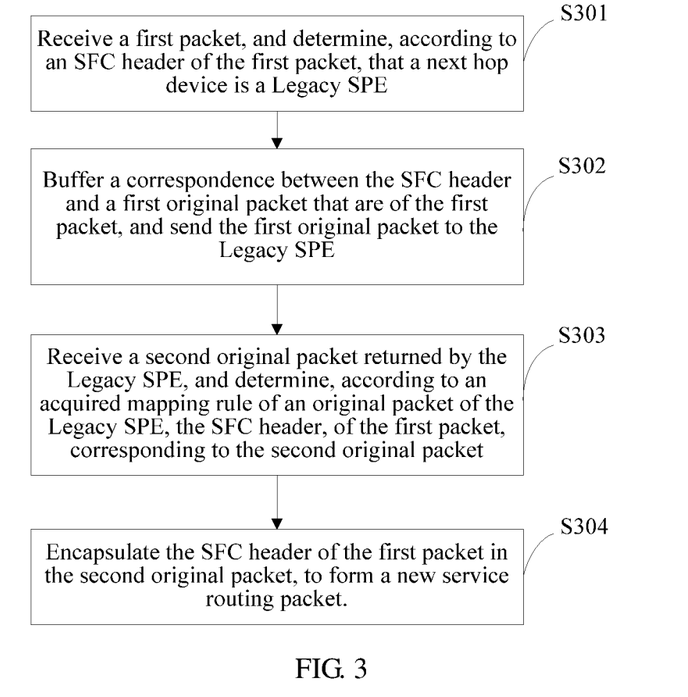
FIG. 3 is a flowchart of a method for encapsulating a service routing packet according to Embodiment 1 of the present application.

Refer to FIG. 3, which is a flowchart of a method for encapsulating a service routing packet according to Embodiment 1 of the present application. As shown in FIG. 3, the method includes:

Step S301: Receive a first packet, and determine, according to an SFC header of the first packet, that a next hop device is a Legacy SPE, where the first packet includes the SFC header and a first original packet.

Step S302: Temporarily store a correspondence between the SFC header and the first original packet that are of the first packet, and send the first original packet to the Legacy SPE.

Step S303: Receive a second original packet returned by the Legacy SPE, and determine, according to an acquired mapping rule of an original packet of the Legacy SPE, that the SFC header of the first packet corresponds to the second original packet.

Step S304: Encapsulate the SFC header of the first packet in the second original packet, to form a new service routing packet.

In this embodiment of the present application, an SFE temporarily stores a correspondence between an SFC header of a first packet before processing by a Legacy SPE and an original packet of the first packet, acquires a mapping rule of the original packet before and after processing by the Legacy SPE, and derives a mapping relationship between a packet after processing by the Legacy SPE and an SFC header of an original packet according to the foregoing correspondence and the mapping rule, thereby implementing re-association of the packet after processing and the SFC header of the original packet, and avoiding a problem of an abnormal interruption caused by a loss of an SFC header.

Figure 4:
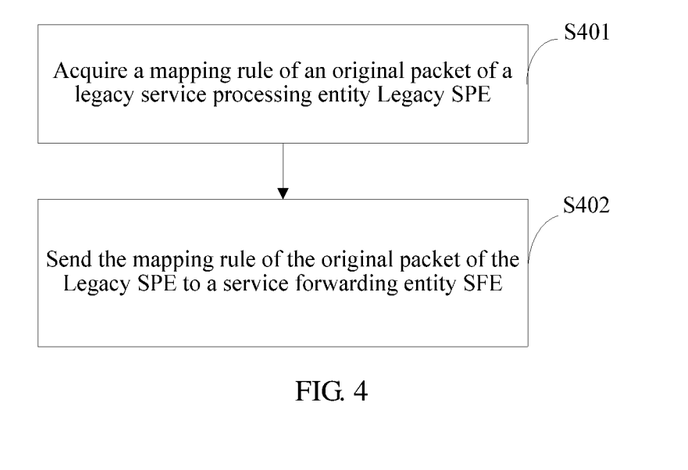
FIG. 4 is a flowchart of a method for encapsulating a service routing packet according to Embodiment 2 of the present application.

Refer to FIG. 4, which is a flowchart of a method for encapsulating a service routing packet according to Embodiment 2 of the present application. As shown in FIG. 4, the method includes:

Step S401: Acquire a mapping rule of an original packet of a legacy service processing entity Legacy SPE.

Step S402: Send the mapping rule of the original packet of the Legacy SPE to a service forwarding entity SFE.

In this embodiment of the present application, a control plane acquires a mapping rule of an original packet of a Legacy SPE, sends the mapping rule of the original packet of the Legacy SPE to an SFE, so that the SFE can acquire a mapping relationship between an original packet before processing by the Legacy SPE and the original packet after processing by the Legacy SPE. By means of this method, the SFE may determine, with reference to a correspondence, between an SFC header of a packet before processing by the Legacy SPE and the first original packet, temporarily stored in advance, a mapping relationship between the original packet after processing by the Legacy SPE and an SFC header of the packet before processing, thereby implementing re-association of the packet after processing and the SFC header of the original packet, and avoiding a problem of an abnormal interruption caused by a loss of an SFC header.

Figure 5:
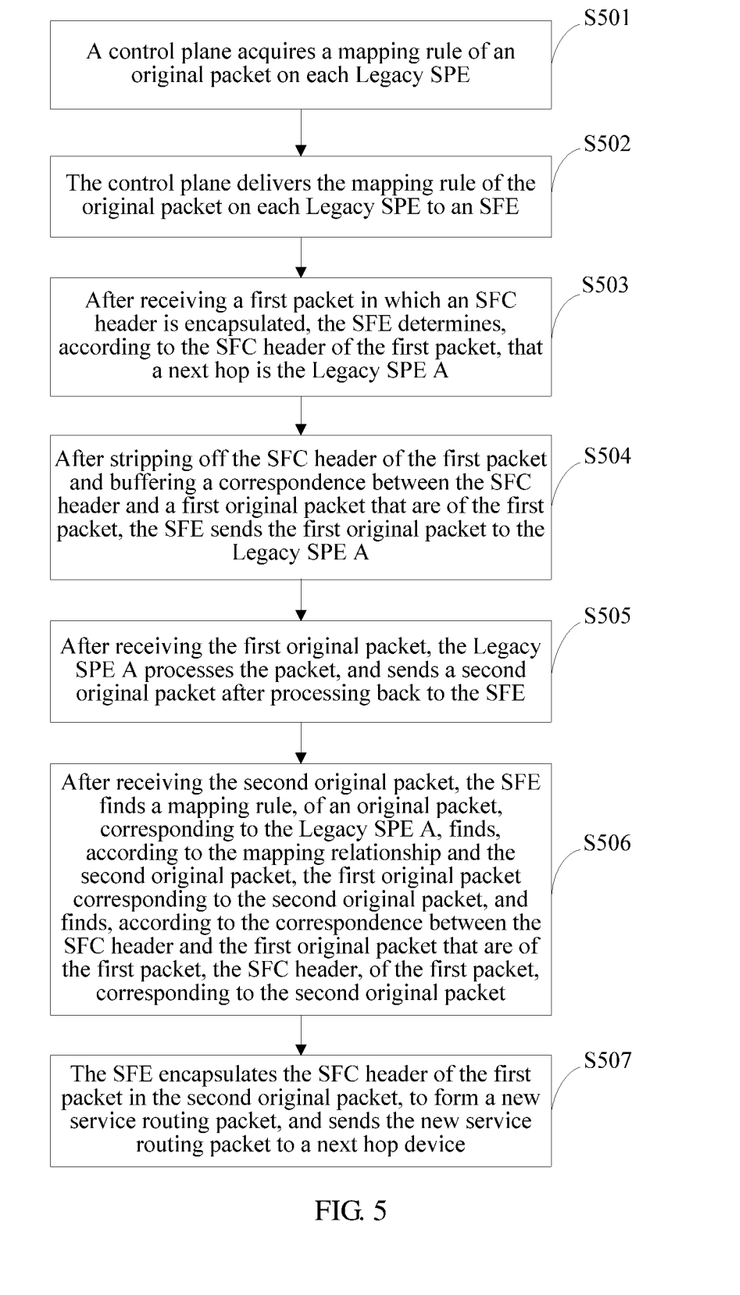
FIG. 5 is a flowchart of a method for encapsulating a service routing packet according to Embodiment 3 of the present application.

Refer to FIG. 5, which is a flowchart of a method for encapsulating a service routing packet according to Embodiment 3 of the present application. With reference to FIG. 5, the method in this embodiment of the present application is described. As shown in FIG. 5, the method includes the following steps:

Step S501: A control plane 15 acquires a mapping rule of an original packet on a Legacy SPE included in a system, where the mapping rule of the original packet may refer to a correspondence between an element included in a packet header of the original packet before processing by the Legacy SPE and an element included in a packet header of the original packet after processing by the Legacy SPE.

It should be noted that, in a transmission path of a packet, multiple Legacy SPEs may exist, and each Legacy SPE has a particular mapping rule of an original packet. Different Legacy SPEs may correspond to a same mapping rule or may correspond to different mapping rules.

For each Legacy SPE, the mapping rule of the original packet of each Legacy SPE may be preset and is stored in each Legacy SPE.

Further, in step 501, the control plane 15 acquires the mapping rule of the original packet on the Legacy SPE, which may be: the Legacy SPE actively sends the mapping rule of the original packet of the Legacy SPE to the control plane 15, or may be: the control plane 15 acquires the mapping rule of the original packet on each Legacy SPE according to a local configuration or a third party.

In this embodiment of the present application, a packet received by the Legacy SPE from the SFE 13 is an original packet from which an SFC header is stripped off, and the Legacy SPE performs SFE processing on the received original packet. Mapping is performed on some elements included in a packet header of the original packet according to a corresponding mapping rule stored in the Legacy SPE.

Specifically, the element included in the packet header of the original packet may be: any element or a combination of any multiple elements in a 5-tuple of the original packet, or may be a checksum of the original packet, or the like.

The 5-tuple includes: a source IP address, a destination IP address, a source port number, a destination port number, and a transport layer protocol number.

Refer to Table 1, which is an exemplary table of a mapping rule of the 5-tuple on the Legacy SPE. Table 1 uses the 5-tuple as an example for description.

As shown in Table 1, when an original 5-tuple is T1, the 5-tuple after processing by an SPE may be T1', or when an original 5-tuple is T2, the 5-tuple after processing by an SPE is T2', and so on. T1, T1', T2, and T2' in Table 1 are all 5-tuple sets.

TABLE 1

Exemplary table of a mapping rule of a 5-tuple on a Legacy SPE

| 5-tuple before processing by an SPE | 5-tuple after processing by an SPE |
|---|---|
| T1 | T1' |
| T2 | T2' |

It may be known from Table 1 that, assuming that a 5-tuple included in an original packet received by a Legacy SPE is T1, and after the original packet is processed by the Legacy SPE, the 5-tuple in the packet after processing is changed to T1'. The correspondence may be obtained by looking up Table 1.

Step S502: The control plane 15 sends the mapping rule of the original packet of the Legacy SPE to the SFE 13.

Therefore, the SFE 13 stores the mapping rule of the original packet of the Legacy SPE.

Step S503: After receiving a first packet in which an SFC header is encapsulated by a classifier 12, the SFE 13 determines, according to the SFC header of the first packet, that a next hop of the first packet is the Legacy SPE A 14. The first packet includes the SFC header and a first original packet.

The Legacy SPE A 14 is a Legacy SPE in the system.

Step S504: After stripping off the SFC header of the first packet, and temporarily storing a correspondence between the SFC header and the first original packet that are of the first packet, the SFE 13 sends the first original packet from which an SFC header is stripped off to the Legacy SPE A 14.

It should be noted that, the correspondence, between the SFC header and the first original packet that are of the first packet, temporarily stored in the SFE 13 specifically refers to a correspondence between elements included in the SFC header of the first packet and the packet header of the first original packet. The element included in the packet header corresponds to the element mentioned in the foregoing mapping rule of the original packet.

When temporarily storing the correspondence between the SFC header and the first original packet that are of the first packet, the SFE 13 also temporarily stores the elements included in the SFC header of the first packet and the packet header of the first original packet, so as to determine, with reference to the correspondence and the mapping rule, that the SFC header of the first packet corresponds to the packet after processing in a subsequent step.

Step S505: After receiving the first original packet, the Legacy SPE A 14 processes the packet, and sends a second original packet after processing back to the SFE 13.

Step S506: After receiving the second original packet returned by the Legacy SPE A 14, the SFE 13 finds a mapping rule, of an original packet, corresponding to the Legacy SPE A 14, finds, according to the mapping relationship and the second original packet, that the first original packet corresponds to the second original packet, and finds, according to the correspondence between the SFC header and the first original packet that are of the first packet, that the SFC header of the first packet corresponds to the second original packet.

Step S507: The SFE 13 encapsulates the SFC header of the first packet in the second original packet, to form a new service routing packet, and sends the new service routing packet to the next hop device.

The SFE 13 receives a mapping rule, of an original packet of each Legacy SPE, sent by the control plane 15, and stores the mapping rule of the original packet of each Legacy SPE in a local database. The local database also includes a mapping rule of the Legacy SPE A 14.

After determining, according to a Path ID in the SFC header of the first packet, that the next hop of the first packet is the Legacy SPE A 14, the SFE 13 extracts a mapping rule of an original packet of the Legacy SPE A 14 from the database.

It should be noted that, if the SFE 13 queries the local database and does not find a mapping rule, of an original packet, corresponding to the next hop device Legacy SPE A 14, the SFE 13 may send a request message to a control plane, to request the control plane to acquire the mapping rule, of the original packet, corresponding to the Legacy SPE A 14. After receiving the request message, the control plane sends the mapping rule, of the original packet, corresponding to the Legacy SPE A 14 to the SFE 13.

According to the second original packet returned from the Legacy SPE A 14, with reference to the mapping rule of the original packet of the Legacy SPE A 14, the original packet (that is, the first original packet), before processing, corresponding to the second original packet is found. Next, with reference to the correspondence, between the SFC header and the first original packet that are of the first packet, stored in the SFE 13, the SFC header, of the first packet, corresponding to the first original packet is found. An association between the SFC header of the first packet and the second original packet is established, and the SFC header of the first packet is encapsulated in the second original packet, to form a new service routing packet, and the new service routing packet is sent to a next hop device.

Figure 6:
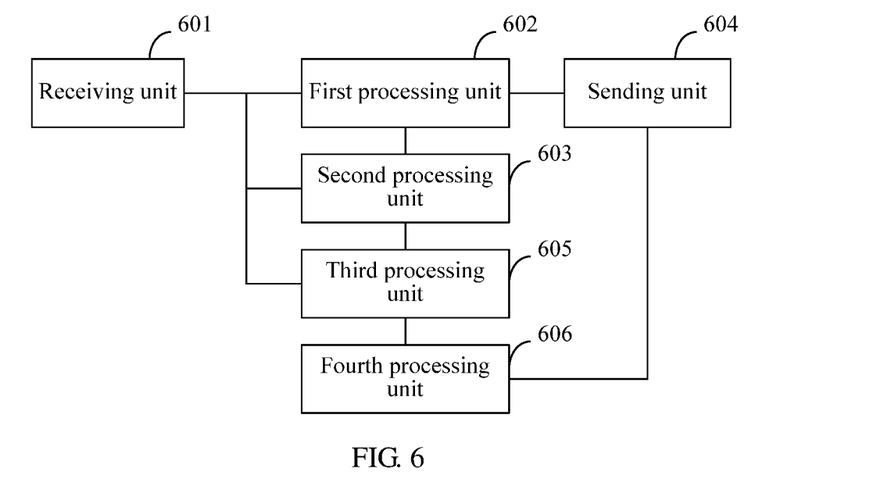
FIG. 6 is a structural block diagram of a service forwarding entity according to Embodiment 1 of the present application.

Corresponding to the method for encapsulating a service routing packet in this embodiment of the present application, an embodiment of the present application further provides a service forwarding entity. Refer to FIG. 6, which is a structural block diagram of a service forwarding entity according to Embodiment 1 of the present application. As shown in FIG. 6, the service forwarding entity SFE includes: a receiving unit 601, a first processing unit 602, a second processing unit 603, a sending unit 604, a third processing unit 605, and a fourth processing unit 606.

The receiving unit 601 is configured to receive a first packet.

The first processing unit 602 is configured to determine that a next hop is a Legacy SPE according to an SFC header of the first packet, where the first packet includes the SFC header and a first original packet.

The second processing unit 603 is configured to temporarily store a correspondence between the SFC header and the first original packet that are of the first packet.

The sending unit 604 is configured to send the first original packet to the Legacy SPE.

The receiving unit 601 is further configured to receive a second original packet returned by the Legacy SPE.

The third processing unit 605 is configured to determine, according to an acquired mapping rule of an original packet of the Legacy SPE, that the SFC header of the first packet corresponds to the second original packet.

The fourth processing unit 606 is configured to encapsulate the SFC header of the first packet in the second original packet, to form a new service routing packet.

In this embodiment of the present application, an SFE temporarily stores a correspondence between an SFC header of a first packet before processing by a Legacy SPE and an original packet of the first packet, acquires a mapping rule of the original packet before and after processing by the Legacy SPE, and derives a mapping relationship between a packet after processing by the Legacy SPE and an SFC header of an original packet according to the foregoing correspondence and the mapping rule, thereby implementing re-association of the packet after processing and the SFC header of the original packet, and avoiding a problem of an abnormal interruption caused by a loss of an SFC header.

Specifically, the mapping rule of the original packet of the Legacy SPE is: a correspondence between an element included in a packet header of the original packet before processing by the Legacy SPE and an element included in a packet header of the original packet after processing by the Legacy SPE.

The element included in the packet header of the original packet is: any element or a combination of any multiple elements in a 5-tuple of the original packet, where the 5-tuple includes a source IP address, a destination IP address, a source port number, a destination port number, and a transport layer protocol number; or a checksum of the original packet.

Further, the third processing unit 605 may include: a first mapping subunit and a second mapping subunit.

The first mapping subunit is configured to determine, according to the mapping rule of the original packet of the Legacy SPE, that the first original packet corresponds to the second original packet.

The second mapping subunit is configured to determine, with reference to the correspondence between the SFC header and the first original packet that are of the first packet, that the SFC header of the first packet corresponds to the second original packet.

Further, the receiving unit 601 is further configured to receive a mapping rule, of an original packet of each Legacy SPE, sent by a control plane.

In this case, the service forwarding entity may further include: an extraction unit, configured to extract the mapping rule of the original packet of the Legacy SPE according to the Legacy SPE determined by the SFC header of the first packet.

Figure 7:
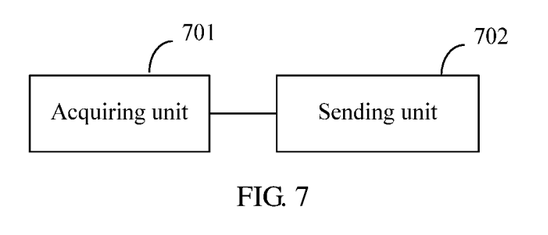
FIG. 7 is a structural block diagram of a control plane according to Embodiment 1 of the present application.

Corresponding to the method for encapsulating a service routing packet in this embodiment of the present application, an embodiment of the present application further provides a control plane. Refer to FIG. 7, which is a structural block diagram of a control plane according to Embodiment 1 of the present application. As shown in FIG. 7, the control plane includes:

An acquiring unit 701 is configured to acquire a mapping rule of an original packet of a legacy service processing entity Legacy SPE.

A sending unit 702 is configured to send the mapping rule of the original packet of the Legacy SPE to a service forwarding entity SFE.

In this embodiment of the present application, a control plane acquires a mapping rule of an original packet of each Legacy SPE, sends the mapping rule of the original packet of each Legacy SPE to an SFE, so that the SFE can acquire a mapping relationship between an original packet before processing by the Legacy SPE and the original packet after processing by the Legacy SPE. By means of this method, the SFE may determine, with reference to a correspondence, between an SFC header of a packet before processing by the Legacy SPE and the first original packet, temporarily stored in advance, a mapping relationship between the original packet after processing by the Legacy SPE and an SFC header of the packet before processing, thereby implementing re-association of the packet after processing and the SFC header of the original packet, and avoiding a problem of an abnormal interruption caused by a loss of an SFC header.

Specifically, the mapping rule of the original packet of the Legacy SPE is: a correspondence between an element included in a packet header of the original packet before processing by the Legacy SPE and an element included in a packet header of the original packet after processing by the Legacy SPE.

The element included in the packet header of the original packet is: any element or a combination of any multiple elements in a 5-tuple of the original packet, where the 5-tuple includes a source IP address, a destination IP address, a source port number, a destination port number, and a transport layer protocol number; or a checksum of the original packet.

Figure 8:
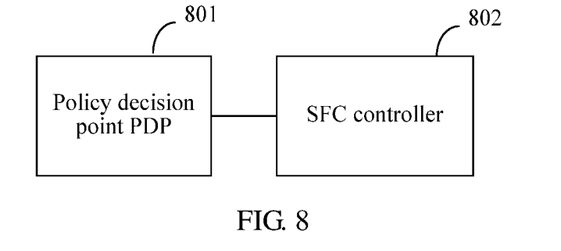
FIG. 8 is a structural block diagram of a control plane according to Embodiment 2 of the present application.

Refer to FIG. 8, which is a structural block diagram of a control plane according to Embodiment 2 of the present application. As shown in FIG. 8, the control plane includes: a policy decision point PDP 801 and an SFC controller 802.

An interaction interface exists between the PDP 801 and a Legacy SPE, an interaction interface exists between the SFC controller 802 and an SFE, and an interaction interface exists between the PDP 801 and the SFC controller 802. The interaction interface implements data communication between two devices connected to each other.

The policy decision point PDP 801 is configured to acquire a mapping rule of an original packet of a legacy service processing entity Legacy SPE.

The SFC controller 802 is configured to send the mapping rule of the original packet of the Legacy SPE to a service forwarding entity SFE.

In this embodiment of the present application, a control plane acquires a mapping rule of an original packet of a Legacy SPE, sends the mapping rule of the original packet of the Legacy SPE to an SFE, so that the SFE can acquire a mapping relationship between an original packet before processing by the Legacy SPE and the original packet after processing by the Legacy SPE. By means of this method, the SFE may determine, with reference to a correspondence, between an SFC header of a packet before processing by the Legacy SPE and the first original packet, temporarily stored in advance, a mapping relationship between the original packet after processing by the Legacy SPE and an SFC header of the packet before processing, thereby implementing re-association of the packet after processing and the SFC header of the original packet, and avoiding a problem of an abnormal interruption caused by a loss of an SFC header.

Specifically, the mapping rule of the original packet of the Legacy SPE is: a correspondence between an element included in a packet header of the original packet before processing by the Legacy SPE and an element included in a packet header of the original packet after processing by the Legacy SPE.

The element included in the packet header of the original packet is: any element or a combination of any multiple elements in a 5-tuple of the original packet, where the 5-tuple includes a source IP address, a destination IP address, a source port number, a destination port number, and a transport layer protocol number; or a checksum of the original packet.

Figure 9:
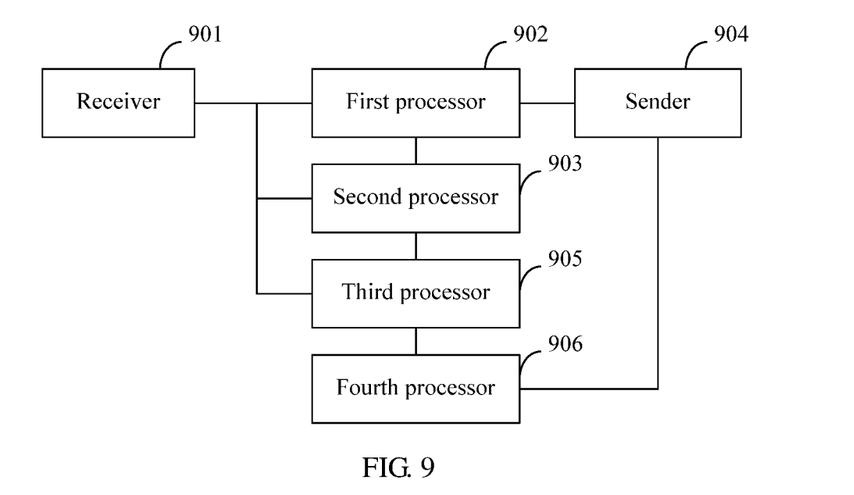
FIG. 9 is a structural block diagram of a service forwarding entity according to Embodiment 2 of the present application.

Corresponding to the method for encapsulating a service routing packet in this embodiment of the present application, an embodiment of the present application further provides a service forwarding entity. Refer to FIG. 9, which is a structural block diagram of a service forwarding entity according to Embodiment 2 of the present application. As shown in FIG. 9, the service forwarding entity SFE includes: a receiver 901, a first processor 902, a second processor 903, a sender 904, a third processor 905, and a fourth processor 906.

The receiver 901 is configured to receive a first packet.

The first processor 902 is configured to determine, according to an SFC header of the first packet, that a next hop is a Legacy SPE, where the first packet includes the SFC header and a first original packet.

The second processor 903 is configured to temporarily store a correspondence between the SFC header and the first original packet that are of the first packet.

The sender 904 is configured to send the first original packet to the Legacy SPE.

The receiver 901 is further configured to receive a second original packet returned by the Legacy SPE.

The third processor 905 is configured to determine, according to an acquired mapping rule of an original packet of the Legacy SPE, that the SFC header of the first packet corresponds to the second original packet.

The fourth processor 906 is configured to encapsulate the SFC header of the first packet in the second original packet, to form a new service routing packet.

In this embodiment of the present application, an SFE, temporarily stores a correspondence between an SFC header of a first packet before processing by a Legacy SPE and an original packet of the first packet, acquires a mapping rule of the original packet before and after processing by the Legacy SPE, and derives a mapping relationship between a packet after processing by the Legacy SPE and an SFC header of an original packet according to the foregoing correspondence and the mapping rule, thereby implementing re-association of the packet after processing and the SFC header of the original packet, and avoiding a problem of an abnormal interruption caused by a loss of an SFC header.

Specifically, the mapping rule of the original packet of the Legacy SPE is: a correspondence between an element included in a packet header of the original packet before processing by the Legacy SPE and an element included in a packet header of the original packet after processing by the Legacy SPE.

The element included in the packet header of the original packet is: any element or a combination of any multiple elements in a 5-tuple of the original packet, where the 5-tuple includes a source IP address, a destination IP address, a source port number, a destination port number, and a transport layer protocol number; or a checksum of the original packet.

Further, the third processor 905 is further configured to determine, according to the mapping rule of the original packet of the Legacy SPE, that the first original packet corresponds to the second original packet, and determine, with reference to the correspondence between the SFC header and the first original packet that are of the first packet, that the SFC header of the first packet corresponds to the second original packet.

Further, the receiver 901 is further configured to receive a mapping rule, of an original packet of each Legacy SPE, sent by a control plane.

In this case, the service forwarding entity may further include: an extractor, configured to extract the mapping rule of the original packet of the Legacy SPE according to the Legacy SPE determined by the SFC header of the first packet.

Figure 10:
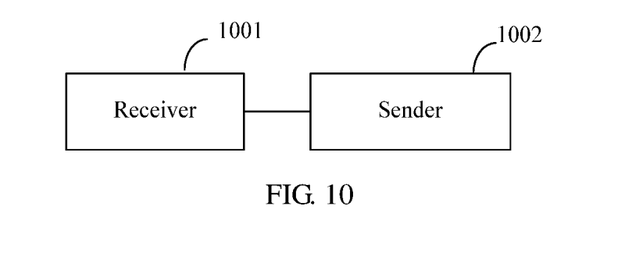
FIG. 10 is a structural block diagram of a control plane according to Embodiment 3 of the present application.

Corresponding to the method for encapsulating a service routing packet in this embodiment of the present application, an embodiment of the present application further provides a control plane. Refer to FIG. 10, which is a structural block diagram of a control plane according to Embodiment 3 of the present application. As shown in FIG. 10, the control plane includes:

a receiver 1001, configured to acquire a mapping rule of an original packet of a legacy service processing entity Legacy SPE.

a sender 1002, configured to send the mapping rule of the original packet of the Legacy SPE to a service forwarding entity SFE.

In this embodiment of the present application, a control plane acquires a mapping rule of an original packet of each Legacy SPE, sends the mapping rule of the original packet of each Legacy SPE to an SFE, so that the SFE can acquire a mapping relationship between an original packet before processing by the Legacy SPE and the original packet after processing by the Legacy SPE. By means of this method, the SFE may determine, with reference to a correspondence, between an SFC header of a packet before processing by the Legacy SPE and the first original packet, temporarily stored in advance, a mapping relationship between the original packet after processing by the Legacy SPE and an SFC header of the packet before processing, thereby implementing re-association of the packet after processing and the SFC header of the original packet, and avoiding a problem of an abnormal interruption caused by a loss of an SFC header.

Specifically, the mapping rule of the original packet of the Legacy SPE is: a correspondence between an element included in a packet header of the original packet before processing by the Legacy SPE and an element included in a packet header of the original packet after processing by the Legacy SPE. The element included in the packet header of the original packet is: any element or a combination of any multiple elements in a 5-tuple of the original packet, where the 5-tuple includes a source IP address, a destination IP address, a source port number, a destination port number, and a transport layer protocol number; or a checksum of the original packet.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for encapsulating a service routing packet, wherein the method comprises:
   receiving a first packet, and determining, according to a service function chain (SFC) header of the first packet, that a next hop is a legacy service processing entity (Legacy SPE), wherein the first packet comprises the SFC header and a first original packet;
   temporarily storing a correspondence between the SFC header and the first original packet that are included in the first packet, and sending the first original packet to the Legacy SPE;
   receiving a second original packet returned by the Legacy SPE, and determining, according to an acquired mapping rule, that the SFC header of the first packet corresponds to the second original packet; and
   encapsulating the SFC header of the first packet in the second original packet to form a new service routing packet.

2. The method according to claim 1, wherein the mapping rule is:
   a correspondence between an element comprised in a first packet header of the first original packet before processing by the Legacy SPE and an element comprised in a second packet header of the second original packet after processing by the Legacy SPE.

3. The method according to claim 2, wherein the element comprised in the first packet header of the first original packet is:
   any element or a combination of any multiple elements in a 5-tuple of the first original packet, wherein the 5-tuple comprises a source IP address, a destination IP address, a source port number, a destination port number, and a transport layer protocol number;
   or
   a checksum of the first original packet.

4. The method according to claim 1, wherein the determining, according to an acquired mapping rule, that the SFC header of the first packet, corresponds to the second original packet comprises:
   determining, according to the mapping rule, that the first original packet corresponds to the second original packet; and
   determining, with reference to the correspondence between the SFC header and the first original packet that are included in the first packet, that the SFC header of the first packet corresponds to the second original packet.

5. The method according to claim 1, wherein the mapping rule is acquired by:
   receiving from a control plane the mapping rule; and
   extracting the mapping rule according to the Legacy SPE determined by the SFC header of the first packet.

6. A service forwarding entity, wherein the service forwarding entity (SFE) comprises:
   a non-transitory memory storing instructions; and
   a processor coupled to the non-transitory memory; wherein the instructions, when executed by the processor, cause the SFE to be configured to:
   receive a first packet;
   determine, according to a service function chain (SFC) header of the first packet, that a next hop is a legacy service processing entity (Legacy SPE), wherein the first packet comprises the SFC header and a first original packet;

temporarily store a correspondence between the SFC header and the first original packet that are included in the first packet;
send the first original packet to the Legacy SPE;
receive a second original packet returned by the Legacy SPE;
determine, according to an acquired mapping rule, that the SFC header of the first packet corresponds to the second original packet; and
encapsulate the SFC header of the first packet in the second original packet, to form a new service routing packet.

7. The service forwarding entity according to claim 6, wherein the mapping rule is:
a correspondence between an element comprised in a first packet header of the first original packet before processing by the Legacy SPE and an element comprised in a second packet header of the second original packet after processing by the Legacy SPE.

8. The service forwarding entity according to claim 7, wherein the element comprised in the first packet header of the first original packet is:
any element or a combination of any multiple elements in a 5-tuple of the first original packet, wherein the 5-tuple comprises a source IP address, a destination IP address, a source port number, a destination port number, and a transport layer protocol number;
or
a checksum of the first original packet.

9. The service forwarding entity according to claim 6, wherein the instructions, when executed by the processor, further cause the SFE to be configured to:
determine, according to the mapping rule, that the first original packet corresponds to the second original packet; and
determine, with reference to the correspondence between the SFC header and the first original packet that are included in the first packet, that the SFC header of the first packet corresponds to the second original packet.

10. The service forwarding entity according to claim 6, wherein the instructions, when executed by the processor, further cause the SFE to be configured to:
receive from a control plane the mapping rule; and
extract the mapping rule according to the Legacy SPE determined by the SFC header included in the first packet.

* * * * *